(12) United States Patent
Fujiwara et al.

(10) Patent No.: US 6,343,100 B1
(45) Date of Patent: Jan. 29, 2002

(54) MOTION-VECTOR DETECTING DEVICE

(75) Inventors: Yoichi Fujiwara, Ichihara; Tadao Matsuura; Hiroshi Kusao, both of Chiba, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/085,001

(22) Filed: May 28, 1998

(30) Foreign Application Priority Data

Jun. 2, 1997 (JP) ............................................. 9-143761

(51) Int. Cl.$^7$ ................................................. H04B 1/66
(52) U.S. Cl. .................. 375/240.17; 382/236; 382/107; 382/232; 382/233
(58) Field of Search ............................. 375/240, 240.17; 348/699, 700, 402, 407, 412, 416; 382/236, 107

(56) References Cited

U.S. PATENT DOCUMENTS

| | | | |
|---|---|---|---|
| 5,319,456 A | | 6/1994 | Nishida et al. |
| 5,436,674 A | * | 7/1995 | Hirabayashi et al. ....... 438/699 |
| 5,598,217 A | | 1/1997 | Yamaguchi |
| 5,787,205 A | * | 7/1998 | Hirabayashi ................ 382/236 |
| 5,894,526 A | * | 4/1999 | Watanabe et al. ........... 382/236 |

OTHER PUBLICATIONS

Puri et al, "Adaptive Frame/Field Motion Compensated Video Coding", Signal Processing, Image Communication, NL, Elsevier Science Publishers, Amsterdam, vol. 5, No. ½, Feb. 1, 1993, pp. 39–58.

deQueiroz, "Subband Processing of Finite Length Signals Without Border Distortions", Proceedings of the International Conference on Acoustics, Speech and Signal Processing (ICASSP), US, New York, IEEE, vol. Conf. 17, Mar. 23, 1992, pp. IV–613–IV–616.

Japanese Laid–open patent publication No. 2–274083 and the English Abstract thereof.

Technical Report of IEICE, CAS95–43, VLD95–43, DSP95–97 (1996–06), pp. 93–99, A VLSI–Suited Motion Estimation Algorithm Based on Macroblock Clustering, Onoy et al.

* cited by examiner

Primary Examiner—Chris Kelley
Assistant Examiner—Shawn S. An
(74) Attorney, Agent, or Firm—Nixon & Vanderhye, P.C.

(57) ABSTRACT

In a motion-vector detecting device for detecting motion-vectors of images processed through a two-dimensional filter by a subsampling method, a filter circuit must process pixel values at a block boundary by delaying the pixel value in both horizontal and vertical directions, which complicates reading pixel data from memory and increases the size of the filter circuit. The present invention provides a motion-vector detecting device for detecting motion-vectors by searching a match of a coding block of a coding image with a prediction candidate-block in a searching area of a reference image. The invention further applies a one-dimensional filter for a coding block and a prediction candidate-block in a horizontal direction to restrict frequency bands of the blocks, and calculates a matching error-value between a part of the pixels in the band-limited coding block and a part of the pixels in the band-limited prediction block to detect a motion-vector, in calculating error-values for a group of pixels by the motion-vector detecting circuit, block-end pixels are considered to exist inside the block boundary by the number of pixels rounded off after a decimal point corresponding to one half of the number of taps of the spatial filters.

20 Claims, 14 Drawing Sheets

FIG.1A (PRIOR ART)

CODING IMAGE

| $T_{0,0}$ | $T_{1,0}$ | $T_{2,0}$ |
|---|---|---|
| $T_{0,1}$ | $T_{1,1}$ | $T_{2,1}$ |
| $T_{0,2}$ | $T_{1,2}$ | $T_{2,2}$ |
| $T_{0,3}$ | $T_{1,3}$ | $T_{2,3}$ |

CODING BLOCK

FIG.1B (PRIOR ART)

REFERENCE IMAGE

MOTION-VECTOR (+2,+1)

| $R_{2,1}$ | $R_{3,1}$ | $R_{4,1}$ |
|---|---|---|
| $R_{2,2}$ | $R_{3,2}$ | $R_{4,2}$ |
| $R_{2,3}$ | $R_{3,3}$ | $R_{4,3}$ |
| $R_{2,4}$ | $R_{3,4}$ | $R_{4,4}$ |

SEARCH AREA

SUB-SAMPLING PATTERN

VERTICAL HIGH-FREQUENCY COMPONENT

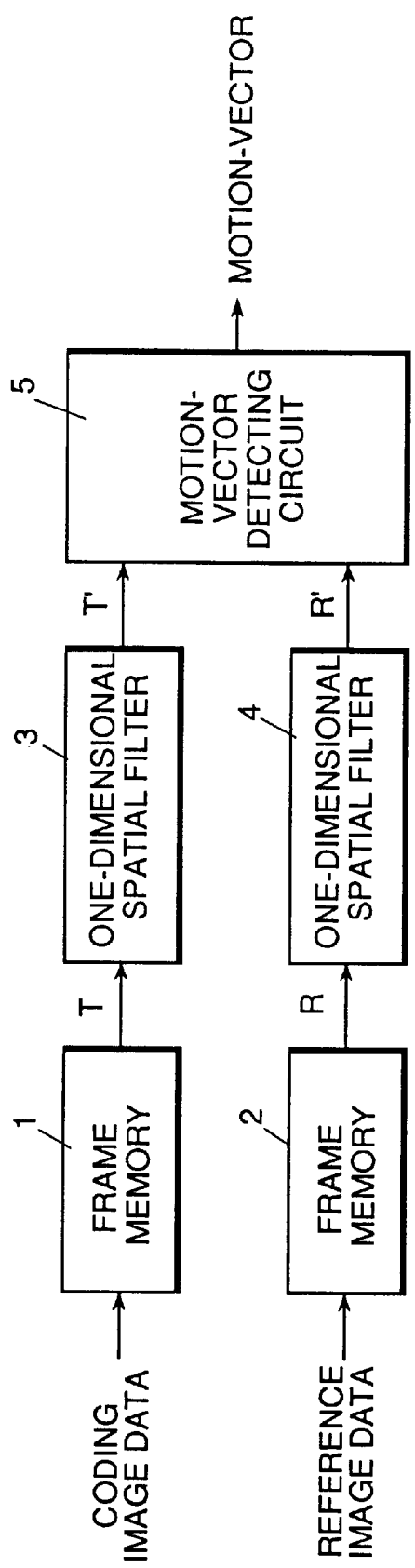

SUB-SAMPLING PATTERN

FILTER COEFFICIENTS (A)

| 1 | 1 | 1 |
|---|---|---|
| 0 | 0 | 0 |
| 1 | 2 | 1 | /10
| 0 | 0 | 0 |
| 1 | 1 | 1 |

FILTER COEFFICIENTS (B)

| 1 | 1 | 1 |
|---|---|---|
| 1 | 2 | 1 | /10
| 1 | 1 | 1 |

SUB-SAMPLING PATTERN

FILTER COEFFICIENTS (C)

| 1 | 1 | 1 |
|---|---|---|
| 1 | 2 | 1 | /10
| 1 | 1 | 1 |

SUB-SAMPLING PATTERN

FILTER COEFFICIENTS

| 1 | 2 | 1 | /4

MOTION-VECTOR DETECTING DEVICE

BACKGROUND OF THE INVENTION

The present invention relates to a motion-vector detecting device used in a video sequence encoding device.

Recently, an interframe coding systems using motion-compensated prediction techniques such as MPEG-1 (ISO/IEC11172) and MPEG-2 ISO/IEC13818) have been increasingly applied in the fields of data storage, communication and broadcast. These systems conduct motion-compensated prediction in such a manner that each image in a video sequence is divided into blocks to be coded (coding blocks) and predicted blocks are determined for each coding block by applying a detected motion-vector to a reference image.

Many systems for detecting motion-vectors use a block matching method. In such systems, a difference (prediction-error) value between a coding block and each prospective prediction candidate-block in a motion-vector searching area is first calculated and a prospective block having a smallest error value is selected as a prediction block. A relative shift value of the prediction block position from the coding block is determined as a motion-vector.

The block matching usually defines a prediction-error $D_{i,j}$ as a total of absolute values of difference between a pixel in a coding block and a pixel in a prospective prediction candidate-block, which has the following expression (1).

In this case, a motion-vector is defined as a value (i, j) which makes the value $D_{i,j}$ smallest. The expression (1) presumes that a block has a size of M×N and a searching area thereof has a horizontal size of [−K:K−1] and a vertical size of [−L:L−1]. In the expression, T represents a pixel value of the coding block and R represents a pixel value of the searching area.

$$D_{i,j} = \sum_{m=0}^{M-1} \sum_{n=0}^{N-1} |R_{m+i,n+j} - T_{m,n}| \quad -K \leq i < K, -L \leq j < L \quad (1)$$

The equation (1) requires M×N times calculations of absolute values of the differences and M×N−1 times additions.

Consider, for example, a motion-vector obtained when M=3, N=4 for the block size and K=3, L=4 for the searching area size. In this instance the motion-vector may be expressed by (i, j)=(+2, +1).

On the other hand, a coding block on an interlaced image is decomposed into fields which motion-vectors are detected for further motion-compensated prediction for respective fields. A prediction-error value for motion-vectors of odd-field components of the coding block (hereinafter called "an odd-field motion-vector") and a prediction-error value for motion-vectors of even-field components of the coding block (hereinafter called "an even-field motion-vector") are determined by the following equations (2) and (3) respectively.

$$Do_{i,j} = \sum_{m=0}^{M-1} \sum_{r=0}^{N/2-1} |R_{m+i,2r+j} - T_{m,2r}| \quad -K \leq i < K, -L \leq j < L \quad (2)$$

$$De_{i,j} = \sum_{m=0}^{M-1} \sum_{r=0}^{N/2-1} |R_{m+i,2r+1+j} - T_{m,2r+1}| \quad -K \leq i < K, -L \leq j < L \quad (3)$$

In Equation (2), $T_{m,2r}$ represents a pixel of the odd field of the coding block but a value $R_{m+i,2r+j}$ may be a pixel of either odd field or even field depending on a value of j. Similarly, in Equation (3), $T_{m,2r+1}$ represents a pixel of the odd field of the coding block but a value $R_{m+i,2r+1+j}$ may be a pixel of either even field or odd field depending on a value of j.

Consider, for example, a field motion-vector determined when a block size is of M=3×N=4 and a searching area of (K=3, L=4). In this instance an odd-field motion-vector (i, j) may be expressed by (+2, +1) and an even-field motion-vector (i, j) may be expressed by (−3, +2).

A frame-motion-vector above-mentioned that is so called in contrast to the field-motion-vector now mentioned.

A variety of algorithms for selecting a prospective prediction candidate-block have been proposed. Several algorithms are described in a document "Technical Report of IEICE (The Institute of Electronics Information and Communication Engineers), CAS95-43, VLD95-43, DSP95-75 (1995-06), pp. 93–99".

Among block-matching methods, a so-called "full search method" is known as a most accurate motion-vector detecting method that is introduced in the above document. The full search method calculates prediction-error values of each of all the prediction candidates-blocks existing in a motion-vector search area by comparing with a coding block. Namely, a value of $D_{i,j}$ expressed by Equation (1) is calculated for each of all the combinations of (i, j) within the ranges of −K≦i<K and −L≦j<L.

With an MPEG system using a block having a size of M=N=16 and a searching area having a size of, e.g., K=L=16, it is necessary to execute a great number of calculations for detecting frame motion-vectors by the full search method, amounting to 262144 (M×N×2K×2L) operations for calculating absolute difference values and to 261120 (M×N−1)×2K×2L operations of addition according to Equation (1).

The document also describes a sub-sampling technique that is known as a method for effectively reducing the huge number of the above-mentioned operations. This method reduces the amount of pixels in each coding block to a certain pattern by sub-sampling pixels therein and performs calculations on only the restricted number of pixels.

With a coding block whose pixels are sub-sampled to ¼ in a horizontal direction and a vertical direction respectively, an error-value necessary for detecting a motion-vector for a frame is equal to $DS_{i,j}$ according to Equation (4).

$$DS_{i,j} = \sum_{p=0}^{M/4-1} \sum_{q=0}^{N/4-1} |R_{4p+i,4q+j} - T_{4p,4q}| \quad -K \leq i < K, -L \leq j < L \quad (4)$$

With M=N=16 and K=L=16, the subsampling method performs 16 (=(M/4)×(N/4)) operations for calculating an absolute value of difference for each of the prediction candidates-block and 15 {(M/4)×(N/4)} operations for determining a sum of the difference values for each of the prediction candidates-block. To determine a frame motion-vector, it is necessary to repeatedly conduct the above calculations on every combination of pixels (i, j), amounting to 16384 (16×2K×2L) calculations of absolute values of difference and to 15360 (15×2K×2L) operations of addition. Thus, the subsampling method can substantially reduce the number of operations as compared to the full search method (according to Equation (1)).

Since the subsampling method reduces by subsampling the number of pixels to be calculated for error-value, it treats the same number of prediction candidate-blocks that the full search method does. Namely, the subsampling method differs from the hierarchical search method which reduces the amount of calculation by reducing the number of prediction candidate-blocks as described in the cited reference.

In the subsampling method, the error calculation accuracy may decrease due to sub-sampled pixels used for calculation, resulting in decreased accuracy of produced motion-vectors. Particularly, an image containing a large amount of fine texture has many high-frequency components and can therefore suffer a considerable decrease of the high-frequency component detection accuracy. Accordingly, there is proposed a motion-vector detecting device which processes each coding block and a prediction candidate-block first with a two-dimensional low-pass filter device and then by sub-sampling pixels in both blocks and finally calculates an error-value (Japanese Laid-open Patent Publication (TOKKAI HEI) No. 2-274083 (motion-vector detecting device)).

Japanese Laid-open Patent Publication (TOKKAI HEI) No. 2-274083 discloses the case of using, as a spatial filter, a two-dimensional low-pass filter that can be expressed by the following transfer function:

$$Z^{-1}W^{-1}(2+Z^1+Z^{-1})(2+W^1+W^{-1})/4 \qquad (5)$$

In the above expression, Z is a delay operator in a horizontal direction and W is a delay operator in a vertical direction. A sub-sampling pattern is also disclosed in the publication.

In the two-dimensional filter as shown in Equation (5), there is a need for alias-processing (folding) of a pixel value at a block boundary where no adjacent pixel value is found.

When a two-dimensional filter having a tap of 3×3 can be applied to a top-left corner pixel, 8 pixel data adjacent to the corner pixel are required. However, because of no pixel existing outside the block boundary, it is needed, before processing with the filter, to set the assumed pixel value outside the block boundary by aliasing the inside pixel-value thereto.

In a two-dimensional filter device, it is necessary to do alias-processing for a pixel value at each block end while making the pixel value delayed in horizontal and vertical directions. To do the alias-processing, the filter device has to perform complicated address control for reading necessary pixel data from a memory. This necessarily increases the circuit of the filter device.

Furthermore, a motion area of an interlaced image contains vertical high-frequency components produced by interlaced scanning, which has no relation with the motion of a subject. These components may cause the motion-vector detecting device to detect erroneous motion-vectors because of the influence of the high-frequency components to pixel values after filter processing.

Japanese Laid-open Patent Publication (TOKKAI HEI) No. 2-274083 cannot detect field motion-vectors because it lacks the concept of using a field image.

SUMMARY OF THE INVENTION

In view of the foregoing, the present invention is directed to a motion-vector detecting device using a subsampling method, which has a small filter circuit to be easily controlled and which can detect both frame-image based motion-vectors and field-image based motion-vectors, assuring the high detection accuracy of motion-vectors even with interlaced images of a video sequence.

An object of the present invention is to provide a motion-vector detecting device for detecting a match between a coding block on an image to be coded (coding image) and a prediction candidate-block on a reference image in a motion-vector searching area of the reference image, the device comprising an one-dimensional spatial filter applied to the coding block, an one-dimensional spatial filter applied to the prediction candidate-block, a motion-vector detecting circuit for detecting a motion-vector by calculating differences between a part of pixels on the coding block and prediction candidate-block, wherein one-dimensional spatial filters are used for limiting bands to the coding block and the prediction candidate-block in vertical or horizontal direction and a motion-vector is detected by calculating matching errors between the part of pixels on the band-limited coding block and the band-limited prediction candidate-block.

Another object of the present invention is to provide a motion-vector detecting device for detecting a field-based motion-vector by searching a match between a field-based coding block on an interlaced coding image and a field-based candidate-block on an interlaced reference image, detecting a frame-based motion-vector by searching a match between a frame-based coding block on an interlaced coding image and a frame-based prediction candidate-block on an interlaced reference image and adaptively selecting either the field-based motion-vector or the frame-based motion-vector, with the device comprising a first field-based spatial filter applied to the field-based coding blocks, a second field-based spatial filter applied to the field-based prediction candidate-blocks of a field-image to be matched with the field-based coding block, a field-based motion-vector detecting circuit for detecting a field-based motion-vector by calculating an error between a part of pixels on the field-based coding block and a part of pixels on a field-based prediction candidate-block, a first frame-based spatial filter applied to the frame-based coding blocks, a second frame-based spatial filter applied to frame-based prediction candidates-block of a frame-image to be matched with the frame-based coding block, a frame-based motion-vector detecting circuit for detecting a frame-based motion-vector by calculating an error between the part of pixels on the frame-based coding block and the part of pixels on the frame-based prediction candidate-block, wherein a field-based motion-vector and a frame-based motion-vector are detected by respective different filters with different band limitations of a field image and a frame image and by calculating a matching error between the part of pixels on the band-limited coding block and the part of pixels on the band-limited prediction candidate-block for each of the field-based image and the frame-based image.

Another object of the present invention is to provide a motion-vector detecting device which is characterized in that the first field-based spatial filter and the first frame-based spatial filter are identical with each other and the second field-based spatial-filter and the second frame-based spatial-filter are identical with each other.

Another object of the present invention is to provide a motion-vector detecting device which is characterized in that the first field-based spatial filter and the second field-based spatial-filter are identical with each other and the first frame-based spatial-filter and the second frame-based spatial-filter are identical with each other.

Another object of the present invention is to provide a motion-vector detecting device which is characterized in that all the first and second field-based spatial-filters and the first and second frame-based spatial-filter are identical.

Another object of the present invention is to provide a motion-vector detecting device which is characterized in that each of the spatial filters is a one-dimensional low-pass filter.

Another object of the present invention is to provide a motion-vector detecting device which is characterized in that each of the spatial filters is a two-dimensional low-pass filter.

Another object of the present invention is to provide a motion-vector detecting device which is characterized in that a part of the spatial filters is one-dimensional and a remaining part is two-dimensional.

Another object of the present invention is to provide a motion-vector detecting device which is characterized in that in calculating error values for a group of pixels by the motion-vector detecting circuit, block-end pixels are considered to exist inside the block boundary by the number of pixels rounded off after a decimal point corresponding to one half of the number of taps of the spatial filters.

BRIEF DESCRIPTION OF DRAWINGS

FIG. 1A is a conceptual view for explaining a block matching method.

FIG. 1B is a conceptual view for explaining a block matching method.

FIG. 6 is a block-diagram of a motion-vector detecting device according to one aspect of the present invention.

PREFERRED EMBODIMENTS OF THE INVENTION

Figure 2A:
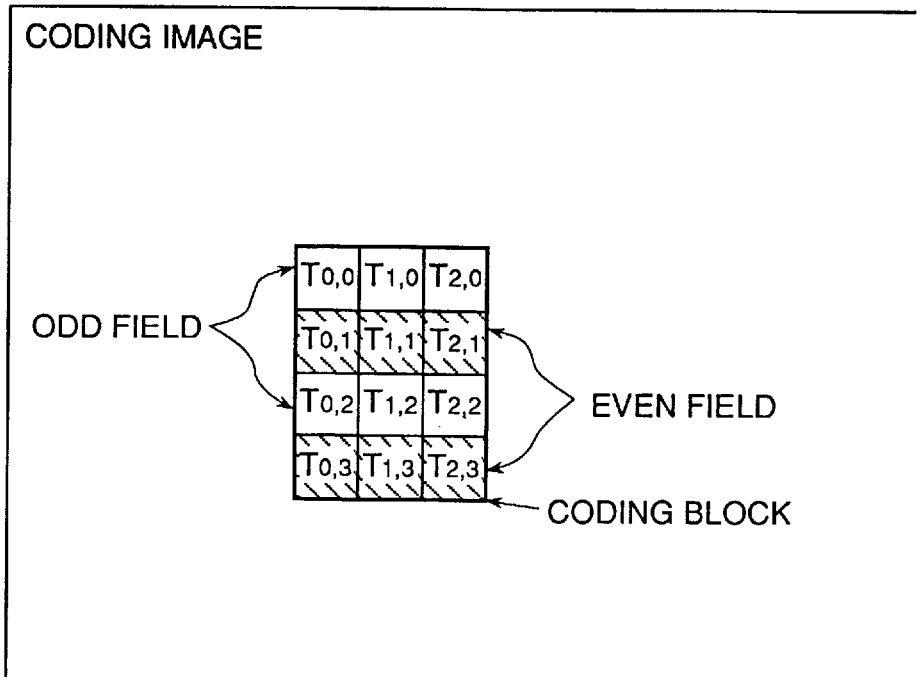
FIG. 2A is a conceptual view for explaining a field-unit block-matching method.

Prior to explaining preferred embodiments of the present invention, prior art motion-vector detecting devices will be described below as references for the present invention.

Recently, interframe coding systems using motion-compensated prediction techniques such as MPEG-1 (ISO/IEC11172) and MPEG-2 (ISO/IEC13818) have been increasingly applied in the fields of data storage, communication and broadcast. The systems conduct motion-compensated prediction in such a manner that each image in a video sequence is divided into blocks to be coded (coding blocks) and predicted blocks are determined for each coding block by applying a detected motion-vector to a reference image.

Many systems for detecting motion-vectors use a block matching method. In such systems, a difference (prediction-error) value between a coding block and each prospective prediction candidate-block in a motion-vector searching area is first calculated and a prospective block having a smallest error value is selected as a prediction block. A relative shift value of the prediction block position from the coding block is determined as a motion-vector.

The block matching usually defines a prediction-error $D_{i,j}$ as a total of absolute values of difference between a pixel in a coding block and a pixel in a prospective prediction candidate-block, which has the following expression (1).

In this case, a motion-vector is defined as a value (i, j) which makes the value $D_{i,j}$ smallest. The expression (1) presumes that a block has a size of M×N and a searching area thereof has a horizontal size of [−K:K−1] and a vertical size of [−L:L−1]. In the expression, T represents a pixel value of the coding block and R represents a pixel value of the searching area.

$$D_{i,j} = \sum_{m=0}^{M-1} \sum_{n=0}^{N-1} |R_{m+i,n+j} - T_{m,n}| \quad -K \leq i < K, -L \leq j < L \quad (1)$$

The equation (1) requires M×N times calculations of absolute values of the differences and M×N−1 times additions.

FIGS. 1A and 1B show an exemplified motion-vector obtained when M=3, N=4 for the block size and K=3, L=4 for the searching area size. In this instance the motion-vector is expressed by (i,j)=(+2,+1).

On the other hand, a coding block on an interlaced image is decomposed into fields which motion-vectors are detected for further motion-compensated prediction for respective fields. A prediction-error value for motion-vectors of odd-field components of the coding block (hereinafter called "an odd-field motion-vector") and a prediction-error value for motion-vectors of even-field components of the coding block (hereinafter called "an even-field motion-vector") are determined by the following equations (2) and (3) respectively.

$$Do_{i,j} = \sum_{m=0}^{M-1} \sum_{r=0}^{N/2-1} |R_{m+i,2r+j} - T_{m,2r}| \quad -K \leq i < K, -L \leq j < L \quad (2)$$

$$De_{i,j} = \sum_{m=0}^{M-1} \sum_{r=0}^{N/2-1} |R_{m+i,2r+1+j} - T_{m,2r+1}| \quad -K \leq i < K, -L \leq j < L \quad (3)$$

In Equation (2), $T_{m,2r}$ represents a pixel of the odd field of the coding block but a value $R_{m+i,2r+j}$ may be a pixel of either odd field or even field depending on a value of j. Similarly, in Equation (3), $T_{m,2r+i}$ represents a pixel of the odd field of the coding block but a value $R_{m+i,2r+1+j}$ may be a pixel of either even field or odd field depending on a value of j.

Figure 2B:
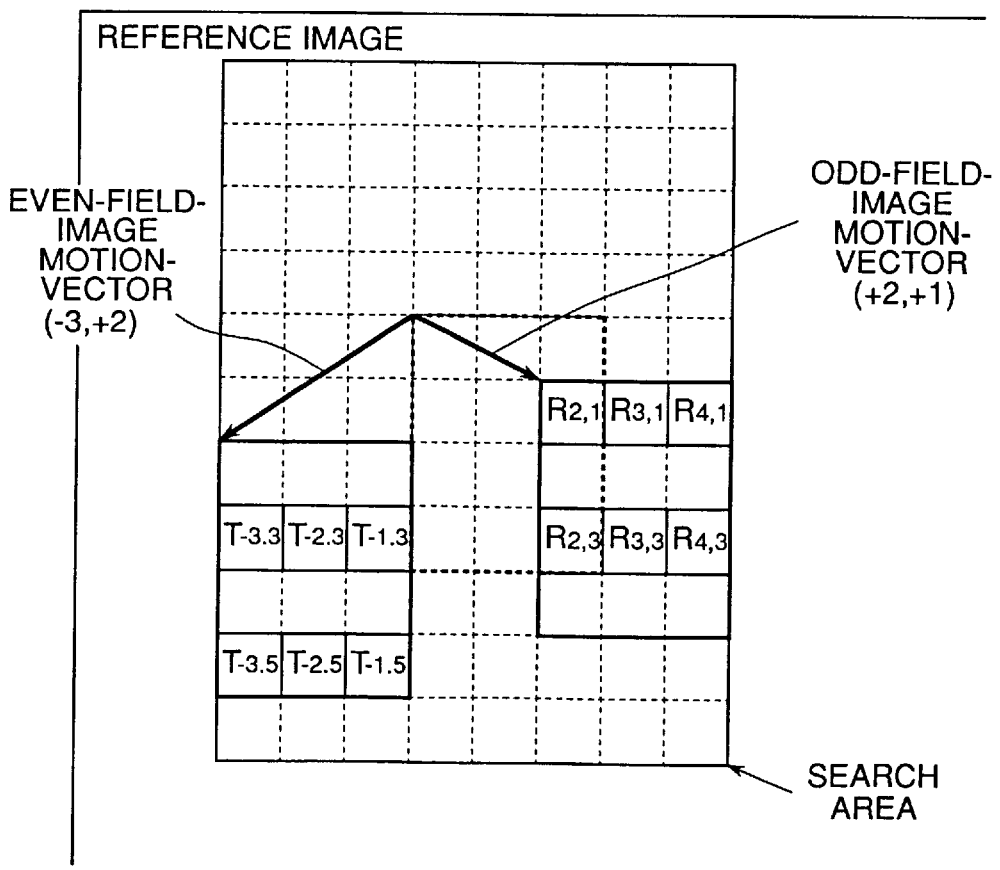
FIG. 2B is a conceptual view for explaining a field-unit block-matching method.

FIGS. 2A and 2B show an exemplified field motion-vector determined when a block size is of M=3×N=4 and a searching area of (K=3, L=4). In FIG. 2A, $T_{0,0}$, $T_{1,0}$, $T_{2,0}$, $T_{0,2}$, $T_{1,2}$, $T_{2,2}$ are pixels of the odd field of the coding block and $T_{0,1}$, $T_{1,1}$, $T_{2,1}$, $T_{0,3}$, $T_{1,3}$, $T_{2,3}$ are pixels of the even field of the coding block. In this instance, as shown in FIG. 2B, an odd-field motion-vector (i, j) is equal to (+2,+1) and an even-field motion-vector (i, j) is equal to (-3, +2).

FIG. 1B shows a frame-motion-vector that is so called in contrast to the field-motion vector shown in FIG. 2B.

A variety of algorithms for selecting a prospective prediction candidate-block have been proposed. Several algorithms are described in a document "Technical Report of IEICE (The Institute of Electronics Information and Communication Engineers), CAS95-43, VLD95-43, DSP95-75 (1995-06), pp. 93–99".

Among block-matching methods, a so-called "full search method" is known as a most accurate motion-vector detecting method that is introduced in the above document. The full search method calculates prediction-error values of each of all the prediction candidates-blocks existing in a motion-vector search area by comparing with a coding block. Namely, a value of $D_{i,j}$ expressed by Equation (1) is calculated for each of all the combinations of (i, j) within the ranges of $-K \leq i < K$ and $-L \leq j < L$.

With and MPEG system using a block having a size of M=N=16 and a searching area having a size of, e.g., K=L= 16, it is necessary to execute a great number of calculations for detecting frame motion-vectors by the full search method, amounting to 262144 (M×N×2K×2L) operations for calculating absolute difference values and to 261120 (M×N−1)×2K×2L operations of addition according to Equation (1).

The document also describes a sub-sampling technique that is known as a method for effectively reducing the huge number of the above-mentioned operations. This method reduces the amount of pixels in each coding block to a certain pattern by sub-sampling pixels therein and performs calculations on only the restricted number of pixels.

With a coding block whose pixels are sub-sampled to ¼ in a horizontal direction and a vertical direction respectively, an error value necessary for detecting a motion-vector for a frame is equal to $DS_{i,j}$ according to Equation (4).

$$DS_{i,j} = \sum_{p=0}^{M/4-1} \sum_{q=0}^{N/4-1} |R_{4p+i,4q+j} - T_{4p,4q}| \quad -K \leq i < K, -L \leq j < L \quad (4)$$

With M=N=16 and K=L=16, the subsampling method performs 16 (=(M/4)×(N/4)) operations for calculating an absolute value of difference for each of the prediction candidates-block and 15 {(M/4)×(N/4)} operations for determining a sum of the difference values for each of the prediction candidates-block. To determine a frame motion-vector, it is necessary to repeatedly conduct the above calculations on every combination of pixels (i, j), amounting to 16384 (16×2K×2L) calculations of absolute values of difference and to 15360 (15×2K×2L) operations of addition. Thus, the subsampling method can substantially reduce the number of operations as compared to the full search method (according to Equation (1)).

Since the subsampling method reduces by sub-sampling the number of pixels to be calculated for error-value, it treats the same number of prediction candidate-blocks that the full search method does. Namely, the subsampling method differs from the hierarchical search method which reduces the amount of calculation by reducing the number of prediction candidate-blocks as described in the cited reference.

In the subsampling method, the error calculation accuracy may decrease due to sub-sampled pixels used for calculation, resulting in decreased accuracy of produced motion-vectors. Particularly, an image containing a large amount of fine texture has many high-frequency components and can therefore suffer a considerable decrease of the high-frequency component detection accuracy. Accordingly, there is proposed a motion-vector detecting device which processes each coding block and a prediction candidate-block first with a two-dimensional low-pass filter device and then by sub-sampling pixels in both blocks and finally calculates an error value (Japanese Laid-open Patent Publication (TOKKAI HEI) No. 2-274083 (motion-vector detecting device.)

Japanese Laid-open Patent Publication (TOKKAI HEI) No. 2-274083 discloses the case of using, as a spatial filter, a two-dimensional low-pass filter that can be expressed by the following transfer function:

$$Z^{-1}W^{-1}(2+Z^1+Z^{-1})(2+W^1+W^{-1})/4 \quad (5)$$

Figure 3:
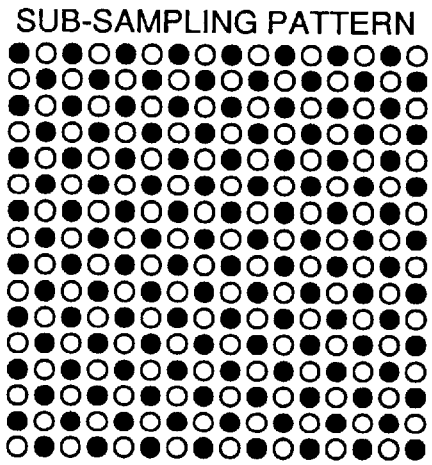
FIG. 3 shows a conventional sub-sampling pattern.

In the above expression, Z is a delay operator in a horizontal direction and W is a delay operator in a vertical direction. A sub-sampling pattern is disclosed as shown in FIG. 3.

Figure 4A:
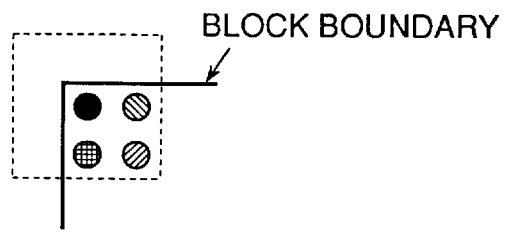
FIG. 4A is view for explaining how to process a block-end pixel value with a two-dimensional filter.
Figure 4B:
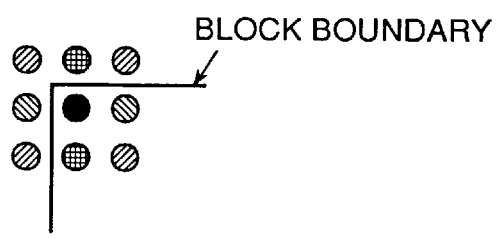
FIG. 4B is view for explaining how to process a block-end pixel value with a two-dimensional filter.

In the two-dimensional filter as shown in Equation (5), there is a need for alias-processing (folding) of a pixel value at a block-end where no adjacent pixel value is found. FIGS. 4A and 4B show an example of alias-processing of a pixel value at a block-boundary.

FIG. 4A illustrates a top-left corner of a block where a pixel (black circle) to be processed with a filter is shown together with adjacent pixels. In FIG. 4A, a two-dimensional filter having a tap of 3×3 can be applied to the top-left corner pixel and requires pixel data in an area enclosed by a broken line. However, because of no pixel existing outside the block boundary in the shown case, it is needed, before processing with the filter, to set the assumed pixel value outside the block boundary by aliasing the inside pixel value thereto, as shown in FIG. 4B, where the same patterned circles show pixels having the same pixel-values.

In a two-dimensional filter device, it is necessary to do alias-processing for a pixel value at each block end while making the pixel value delayed in horizontal and vertical directions. To do the alias-processing, the filter device has to perform complicated address control for reading necessary pixel data from a memory. This necessarily increases the circuit of the filter device.

Figure 5A:
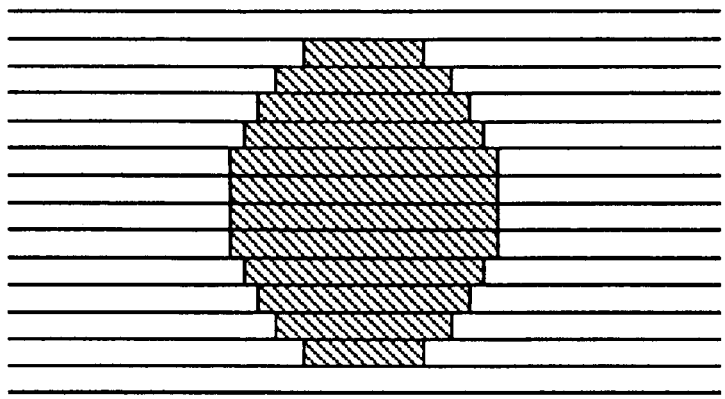
FIG. 5A is a view for explaining vertical high-frequency components resulted from interlaced scanning.
Figure 5B:
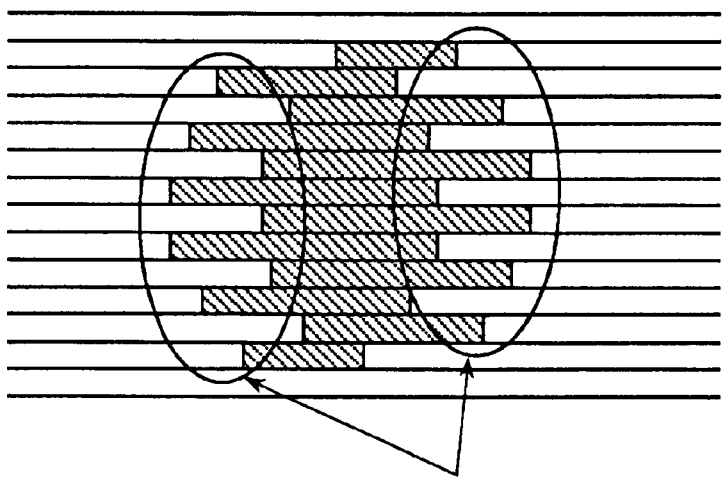
FIG. 5B is a view for explaining vertical high-frequency components resulted from interlaced scanning.

Furthermore, a motion area of an interlaced image contains vertical high-frequency components produced by interlaced scanning, which has no relation with the motion of a subject. FIGS. 5A and 5B illustrates an example of vertically directed high-frequency components produced from interlaced scanning. FIG. 5A shows a still state of a subject in an image and FIG. 5B shows the state when the subject of FIG. 5A moved in a horizontal direction. In this instance, areas enclosed each by an oval contain high-frequency components produced in a vertical direction. These components may cause the motion-vector detecting device to detect erroneous motion-vectors because of the influence of the high-frequency components to pixel values after filter processing.

Japanese Laid-open Patent Publication (TOKKAI HEI) No. 2-274083 cannot detect field motion-vectors because it lacks the concept of using a field image.

FIG. 6 is a block diagram of an embodiment of the present invention.

As shown in FIG. 6, this embodiment comprises a coding image frame memory 1 for storing pixels of a coding block, a reference image frame memory 2 for storing pixels in a motion-vector searching area, one-dimensional spatial filters 3, 4 and a motion-vector detecting circuit 5 for detecting a motion-vector for each block through calculation of matching error values using part of the pixels in the block.

The operation of the motion-vector detecting device of FIG. 6 is as follows:

The frame memory 1 holds pixel data in a coding image frame and the frame memory 2 holds pixel data in a reference image frame.

The pixel data $T_{m,n}$ of the coding block is output from the frame memory 1 and enters the one-dimensional spatial filter 3 through which a coding block T' having a restricted spatial frequency band of the input block is then output.

In parallel with the above-mentioned process, a pixel value $R_{m+i,n+j}$ of a prediction candidate-block, which corresponds to a motion-vector (i,j), is output from the reference frame-image memory 2 and enters the one-dimensional spatial filter 4 by which it is restricted in the same band as the coding block T and output as a band-restricted prediction candidate-block R'.

The motion-vector detecting circuit 5 calculates a matching error between the band-restricted coding block and the band-restricted prediction candidate-block by using part of the pixel data T' and part of the pixel data R'. The motion-vector detecting circuit 5 detects a prospective prediction candidate-block having a least error value and outputs information (i, j) of the detected block.

Figure 11:
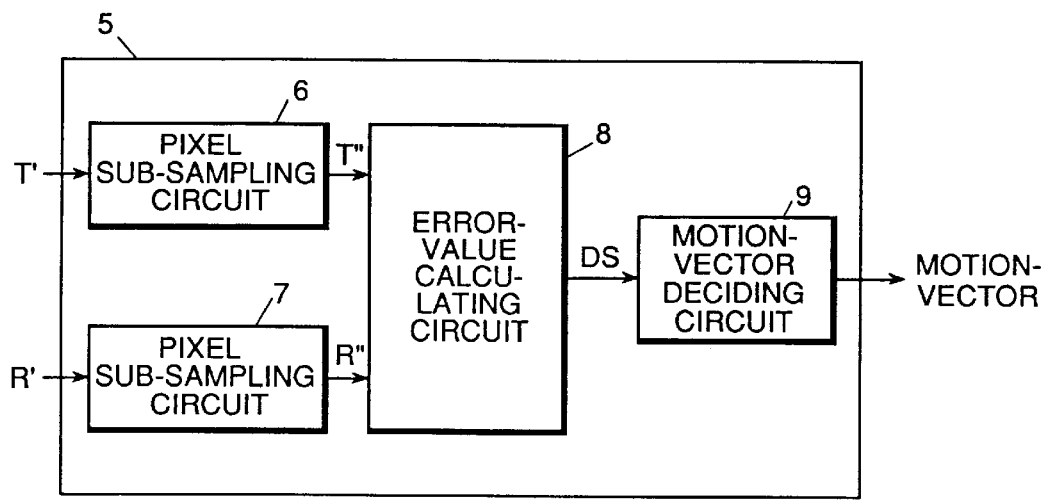
FIG. 11 is a block-diagram of a frame motion-vector detecting circuit for detecting frame motion-vectors.

FIG. 11 is a block-diagram of the motion-vector detecting circuit 5 of FIG. 6. This circuit includes pixel sub-sampling circuits 6, 7, an error-value calculating circuit 8 for determining a block matching error between blocks by using sub-sampled pixel data and a motion-vector deciding circuit 9 for determining a motion-vector by detecting a least matching error value.

The operation of the motion-vector detecting device of FIG. 11 is as follows:

The block pixel data T' and R' is input to the subsampling circuits 6 and 7, respectively, which output blocks T' and R' sub-sampled according to a specified pattern. The error-value calculating circuit 8 determines a matching error-value between the two sub-sampled blocks T' and R' and outputs the determined error value $DS_{i,j}$. The motion-vector deciding circuit 9 detects the least of error values $DS_{i,j}$ determined by varying the variable (i, j) and outputs a motion-vector which is a value (i, j) corresponding to the detected least-error value $DS_{i,j}$.

Figure 14A:
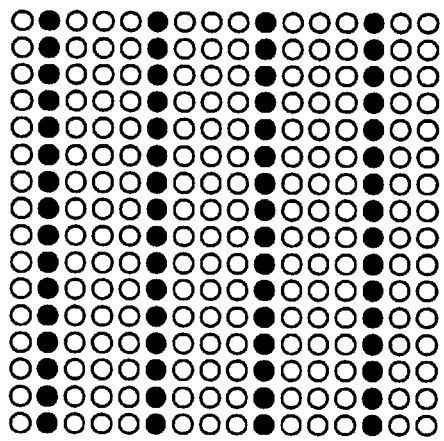
FIG. 14A is an exemplified pixel sub-sampling pattern and filter coefficients used in the embodiment of the present invention.
Figure 14B:
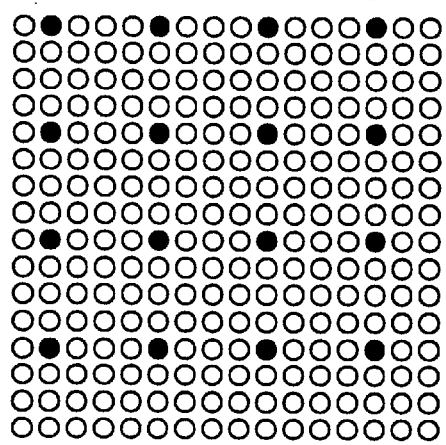
FIG. 14B is an exemplified pixel sub-sampling pattern and filter coefficients used in the embodiment of the present invention.
Figure 14C:
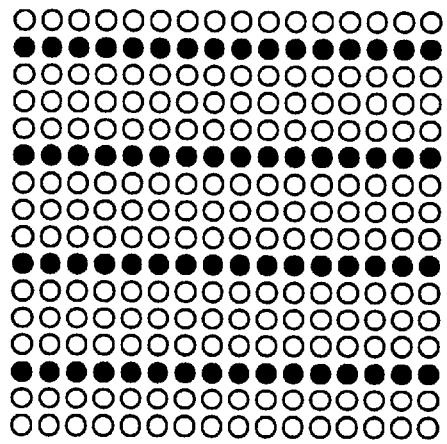
FIG. 14C is an exemplified pixel sub-sampling pattern and filter coefficients used in the embodiment of the present invention.

FIGS. 14A, 14B and 14C depict exemplified pixel sub-sampling patterns and filter coefficients when embodiments of the present invention work with blocks having a size of M=N=16. In FIGS. 14A, 14B and 14C, black circles are pixels to be used for calculating a matching error-value and white circles are pixels to be thinned out.

In FIG. 14A, pixels are sub-sampled to ¼ in horizontal rows only by horizontally applying a one-dimensional three-tapped FIR low-pass filter of [1, 2, 1]/4 as a spatial filter.

In this instance, a coding block having a frequency band limited in a horizontal direction can be expressed according to the following equation (6):

$$T'_{m,n} = \frac{T_{m-1,n} + 2T_{m,n} + T_{m+1,n}}{4} \quad (6)$$

Similarly, a prediction candidate-block having a frequency band limited in a horizontal direction can be expressed according to the following equation (7):

$$R'_{m+i,n+j} = \frac{R_{m+i-1,n+j} + 2R_{m+i,n+j} + R_{m+i+1,n+j}}{4} \quad (7)$$

Accordingly, a matching error-value $DS_{i,j}$ to be determined by using the subsampling method can be expressed according to following equation (8):

$$DS_{i,j} = \sum_{p=0}^{M/4-1} \sum_{q=0}^{N-1} |R'_{4p+i+1,q+j} + T'_{4p+1,q}| \quad (8)$$

In Equation (8), T' and R' are determined by Equations (6) and (7) respectively.

The matching error-value calculating operation is carried out on all combinations (i,j) and a combination (i,j) whose error-value $DS_{i,j}$ is the least of the determined error-values. This is a motion-vector that is then output from the motion-vector deciding circuit 9 of FIG. 11.

In FIG. 14B, pixels are sub-sampled to ¼ in horizontal and vertical directions by horizontally applying a one-dimensional three-tapped FIR low-pass filter of [1, 2, 1]/4 as a spatial filter.

In this instance, a matching error-value $DS_{i,j}$ to be determined by using the subsampling method can be expressed according to following equation (9):

$$DS_{i,j} = \sum_{p=0}^{M/4-1} \sum_{q=0}^{N/4-1} |R'_{4p+i+1,4q+j} - T'_{4p+1,4q}| \quad (9)$$

In Equation (9), T' and R' are determined by Equations (6) and (7) respectively.

Although pixels are sub-sampled in horizontal and vertical directions in the case of FIG. 14B, a considerable effect can be obtained by applying the one-dimensional spatial filter in a horizontal direction only. A similar effect can be also obtained by applying the one-dimensional filter in a vertical direction only.

In FIG. 14C, pixels are sub-samples to ¼ in a vertical direction by vertically applying a one-dimensional three-tapped FIR low-pass filter of [1, 2, 1]/4 as a spatial filter.

In this instance, a coding block having a frequency band limited in a vertical direction can be expressed according to the following equation (10):

$$T'_{m,n} = \frac{T_{m,n-1} + 2T_{m,n} + T_{m,n+1}}{4} \quad (10)$$

Similarly, a prediction candidate-block having a frequency band limited in a vertical direction can be expressed according to the following equation (11):

$$R'_{m+i,n+j} = \frac{R_{m+i,n+j-1} + 2R_{m+i,n+j} + R_{m+i,n+j+1}}{4} \quad (11)$$

Therefore, a matching error-value $DS_{i,j}$ to be determined by using the subsampling method can be expressed according to following equation (12):

$$DS_{i,j} = \sum_{p=0}^{M-1} \sum_{q=0}^{N/4-1} |R'_{p+i,4q+j+1} - T'_{p,4q+1}| \quad (12)$$

In Equation (12), T' and R' are determined by Equations (10) and (11) respectively.

Figure 18A:
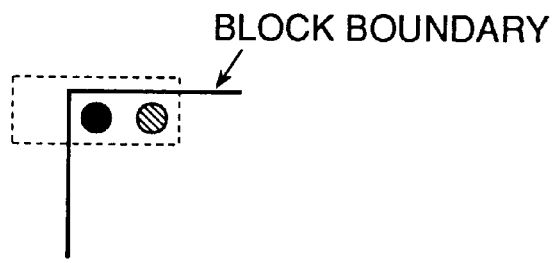
FIG. 18A is view for explaining how to process a block-end pixel value with a one-dimensional filter.
Figure 18B:
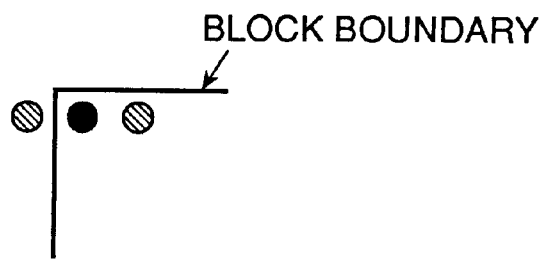
FIG. 18B is view for explaining how to process a block-end pixel value with a one-dimensional filter.

FIGS. 18A and 18B depict how to alias-process pixels at a block end when horizontally applying a one-dimensional filter. In FIG. 18a, there is shown a pixel existing in the upper left corner of a block and an adjacent pixel. FIG. 18B depicts the pixel alias-processing when using a three-tapped one-dimensional filter. In FIG. 18A, a black circle is a pixel to be processed with the filter and a rectangle drawn by a broken line designates adjacent pixels necessary for processing with the filter. In FIG. 18B, like patterned pixels have the same pixel value.

The one-dimensional filter requires delaying pixel values in a horizontal or vertical direction only, so pixels at block ends may be alias-processed in a horizontal or vertical direction only. Namely, a filter circuit with a one-dimensional filter may be considerably simplified as compared with that with a two-dimensional filter.

In the cases of FIGS. 14A, 14B and 14C, the pixels (shown by black circles) to be used for calculation of block-matching errors are set inside the block boundary and are not less than the number of pixels (1 in the shown cases) that are rounded off after a decimal point corresponding to one half of the number of the filter taps of the filter.

Thus, the existence of all pixels required for the filtering have no need for alias-processing. Accordingly, it simplifies on a large scale the filter circuit and its control.

Figure 7:
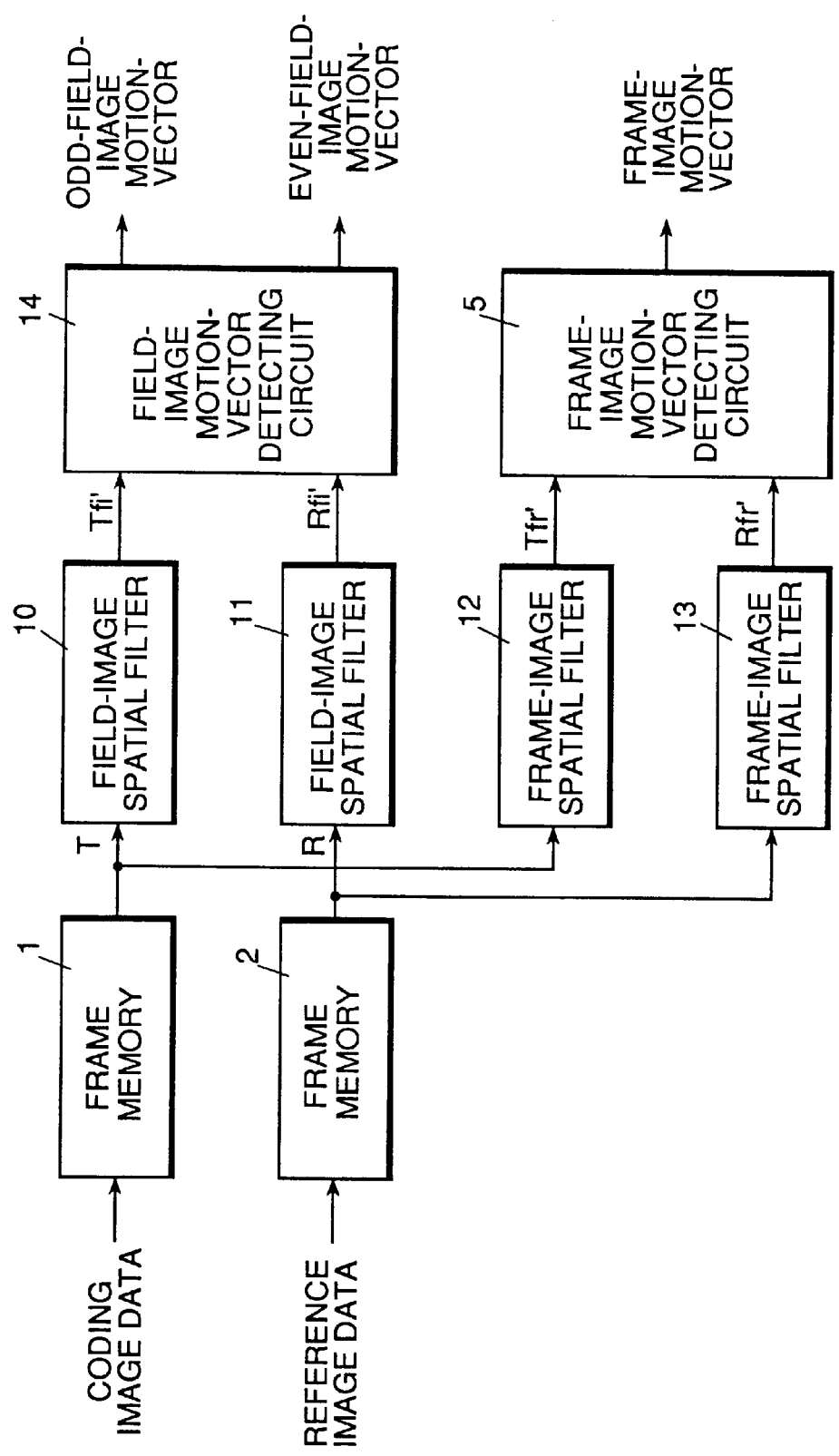
FIG. 7 is a block-diagram of a motion-vector detecting device according to another aspect of the present invention.

FIG. 7 shows a block diagram of another embodiment of the present invention. This motion-vector detecting device comprises field-based (field-image-based) spatial filters 10 and 11 that are applied to the field-based coding blocks and field-based prediction candidate-blocks respectively, frame-based (frame-image-based) spatial filters 12 and 13 that are applied to the frame-based coding blocks and the frame-based prediction candidate-blocks respectively, a field-based motion-vector detecting circuit 14 for detecting an odd-field-based motion-vector and even-field-based motion-vector by determining an error between a part of plural pixels of the field-based band-limited coding block and a part of plural pixels of the field-based band-limited prediction candidate-block and a frame-based motion-vector detecting circuit 5 for detecting a frame-based motion-vector by determining an error between a part of plural pixels of the frame-based band-limited coding block and a part of plural pixels of the frame-based band-limited prediction candidate-block. The frame-based (frame-image-based) motion-vector detecting circuit 5 is identical to the motion-vector detecting circuit of FIG. 6. The components similar in function to those shown in FIG. 6 are given the same reference numerals.

Figure 12:
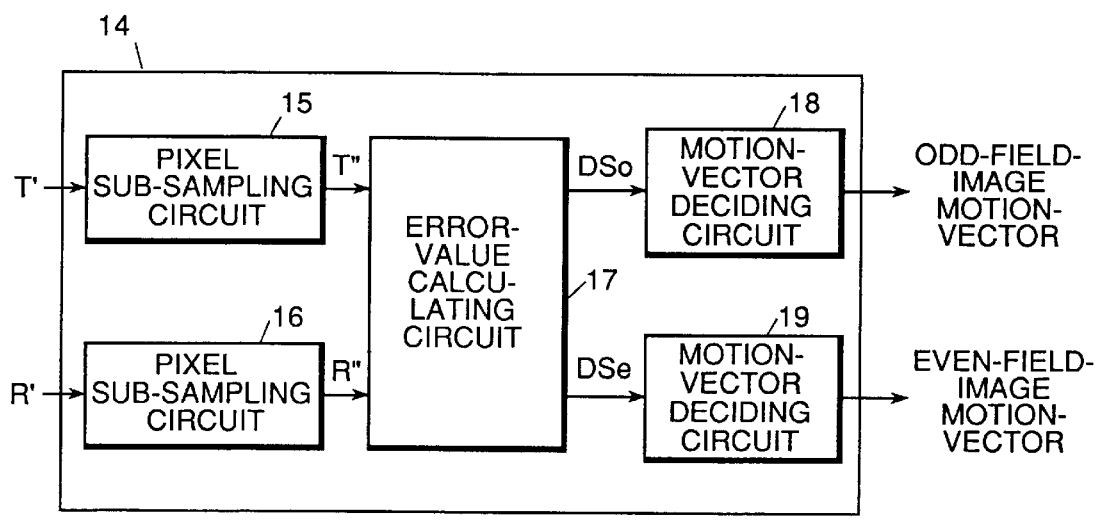
FIG. 12 is a block-diagram of a field motion-vector detecting circuit for detecting field motion-vectors.

In FIG. 12, there is shown a block-diagram of the field-based (field-image-based) motion-vector detecting circuit 14 shown in FIG. 7, which includes pixel sub-sampling circuits 15 and 16 each for sub-sampling pixel data in a block according to a specified pattern, an error-value calculating circuit 17 for calculating a block-matching error-value per field of the block from the sub-sampled pixel data, a motion-vector deciding circuit 18 for determining an odd-field motion-vector by detecting a least one of error-values determined for odd-fields of the coding block and a motion-vector deciding circuit 19 for determining an even-field motion-vector by detecting a least one of error-values determined for even-fields of the coding block.

Figure 15A:
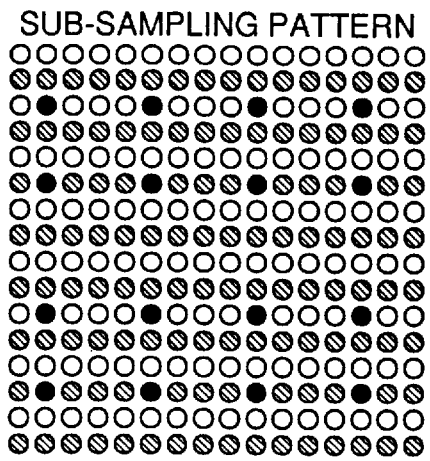
FIG. 15A is an exemplified pixel sub-sampling pattern and filter coefficients used in the embodiment of the present invention.
Figure 15B:
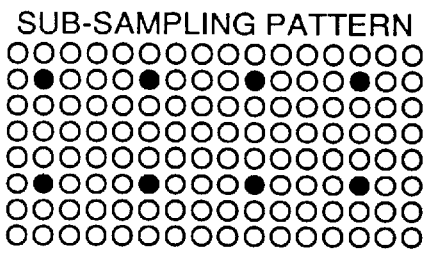
FIG. 15B is an exemplified pixel sub-sampling pattern and filter coefficients used in the embodiment of the present invention.

FIGS. 15A and 15B depict exemplified pixel sub-sampling patterns and filter coefficients for use in the embodiment of the present invention when operating with blocks having a size of M=N=16. In FIGS. 15A and 15B, black circles are pixels to be used for determining a matching error-value, white circles are pixels of odd-fields and hatched circles are pixels of even-fields. In FIG. 15A, a two-dimensional spatial filter is used. A one-dimensional spatial filter may, of course, be used instead of the two-dimensional.

Referring to FIG. 15A, the operations of the motion-vector detecting de vice FIG. 7 including the circuits of FIGS. 11 and 12 will be described below:

In this instance, pixels $T_{m,n}$ of a coding block on frame-by-frame basis are read out from the frame memory 1 and inputted to the field-based spatial filters 10 and the frame-based spatial filter 12. The field-based spatial filter 10 possesses filter coefficients (A) shown in FIG. 15A and the frame-based spatial filter 12 possesses filter coefficients (B) shown in FIG. 15A.

With the filter coefficients (A), the coefficient values in the second row and the fourth row are all zeros. This is the same that respective filter coefficients (C) are applied to respective odd-field and even-field into which the coding block is decomposed as shown in FIG. 15B. The filter coefficients for the second and fourth rows may be set at a value other than zero, but the coding block, however, cannot be decomposed into the fields as shown in FIG. 15B.

Pixel data of the band-limited coding block, which is processed with filter coefficients (A) shown in FIG. 15A, can be expressed according to Equation (13) while pixel data of the band-limited coding block, which is processed with filter coefficients (B) shown in FIG. 15A, can be expressed according to Equation (14).

$$Tfi'_{m,n}=(T_{m-1,n-2}+T_{m,n-2}+T_{m+1,n-2}+T_{m-1,n}+2T_{m,n}+T_{m+1,n}+T_{m-1,n+2}+T_{m,n+2}+T_{m+1,n+2})/10 \quad (13)$$

$$Tfr'_{m,n}=(T_{m-1,n-1}+T_{m,n-1}+T_{m+1,n-1}+T_{m-1,n}+2T_{m,n}+T_{m+1,n}+T_{m-1,n+1}+T_{m,n+1}+T_{m+1,n+1})/10 \quad (14)$$

Similarly to that of coding block, pixel data of a prediction candidate-block is read from the frame memory 2 and transferred to the field-based spatial filter 11 and the frame-based spatial filter 13 for restricting the frequency band of the block in FIG. 7. The pixel data of the band-limited prediction candidate-block, which is processed with filter coefficients (A) shown in FIG. 15A, can be expressed according to Equation (15) while pixel data of the band-limited prediction candidate-block, which is processed with filter coefficients (B) shown in FIG. 15A, can be expressed according to Equation (16).

$$Rfi'_{m+i,n+j}=(R_{m+i-1,n+j-2}+R_{m+i,n+j-2}+R_{m+i+1,n+j-2}+R_{m+i-1,n+j}+2R_{m+i,n+j}+R_{m+i+1,n+j}+R_{m+i-1,n+j+2}+R_{m+i,n+j+2}+R_{m+i+1,n+j+2})/10 \quad (15)$$

$$Rfr'_{m+i,n+j}=(R_{m+i-1,n+j-1}+R_{m+i,n+j-1}+R_{m+i+1,n+j-1}+R_{m+i-1,n+j}+2R_{m+i,n+j}+R_{m+i+1,n+j}+R_{m+i-1,n+j+1}+R_{m+i,n+j+1}+R_{m+i+1,n+j+1})/10 \quad (16)$$

The pixel data of the band-limited coding block through the spatial filter and the pixel data of the band-limited prediction candidate-block through the spatial filter are inputted to the field-based motion-vector detecting circuit 14 (FIG. 7) and frame-based motion-vector detecting circuit 5 (FIG. 7) respectively.

Field-based motion-vectors and frame-based motion-vectors are detected respectively.

In field-based motion-vector detecting circuit 14 of FIG. 12, the pixel data (Equation (13)) of the band-limited field-based coding block and the pixel data (Equation (15)) of the band-limited frame-based prediction candidate-block are sub-sampled to the pattern shown in FIG. 15A by the sub-sampling circuits 15 and 16 respectively. Matching error-values $DSo_{i,j}$ for odd-field pixels of the coding block and matching error-values $DSe_{i,j}$ for even-field pixels of the coding block are determined by the error-value calculating circuit 17. The error-values $DSo_{i,j}$ and $DSe_{i,j}$ are represented by Equations (17) and (18) respectively. In the Equations (17) and (18), subscript 4p means that pixels in a block are sub-sampled to ¼ and in a horizontal direction and subscript 8q means that pixels in a block are sub-sampled to ¼ for the same fields in a vertical direction as shown in FIG. 15B, resulting in vertical sub-sampling of pixels to ⅛ for a frame as shown in FIG. 15A.

$$DSo_{i,j} = \sum_{p=0}^{M/4-1} \sum_{q=0}^{N/8-1} |Rfi'_{4p+i+1,8q+j+2} - Tfi'_{4p+1,8q+2}| \quad (17)$$

$$DSe_{i,j} = \sum_{p=0}^{M/4-1} \sum_{q=0}^{N/8-1} |Rfi'_{4p+i+1,8q+j+5} - Tfi'_{4p+1,8q+5}| \quad (18)$$

In the frame motion-vector detecting circuit 5 of FIG. 11, pixel data of a frame-based band-limited coding block and pixel data of a frame-based band-limited prediction candidate-block are sub-sampled to the pattern shown in FIG. 15A by the pixel sub-sampling circuits 6 and 7 respectively, then a matching error-value $DS_{i,j}$ for the frame-based coding block is determined by the error-value calculating circuit 8. The error-value $DS_{i,j}$ is expressed by the following equation (19):

$$DS_{i,j} = \sum_{p=0}^{M/4-1} \sum_{q=0}^{N/8-1} |Rfr'_{4p+i+1,8q+j+2} - Tfr'_{4p+1,8q+2}| + |Rfr'_{4p+i+1,8q+j+5} - Tfr'_{4p+1,8q+5}| \quad (19)$$

In the motion-vector deciding circuits 18, 19 of FIG. 12 and the motion-vector deciding circuit 9 of FIG. 11, least ones of error-values $DSo_{i,j}$, $DSe_{i,j}$ and $DS_{i,j}$ are detected as an odd-field motion-vector, an even-field motion-vector and a frame motion-vector.

In this embodiment, the filter is applied to a frame when detecting a frame-based motion-vector while the filter is applied to a field image when detecting a field-based motion-vector. Namely, motion-vectors can be detected at high accuracy even for an interlaced image owing to application of a filter adapted to a base unit for which a motion-vector is detected.

Furthermore, pixels (black circles) to be used for determining an error-value in FIGS. 15A and 15B are disposed in the same way as those shown in FIGS. 14A, 14B and 14C to eliminate the need to alias-process pixels at the block ends.

Figure 8:
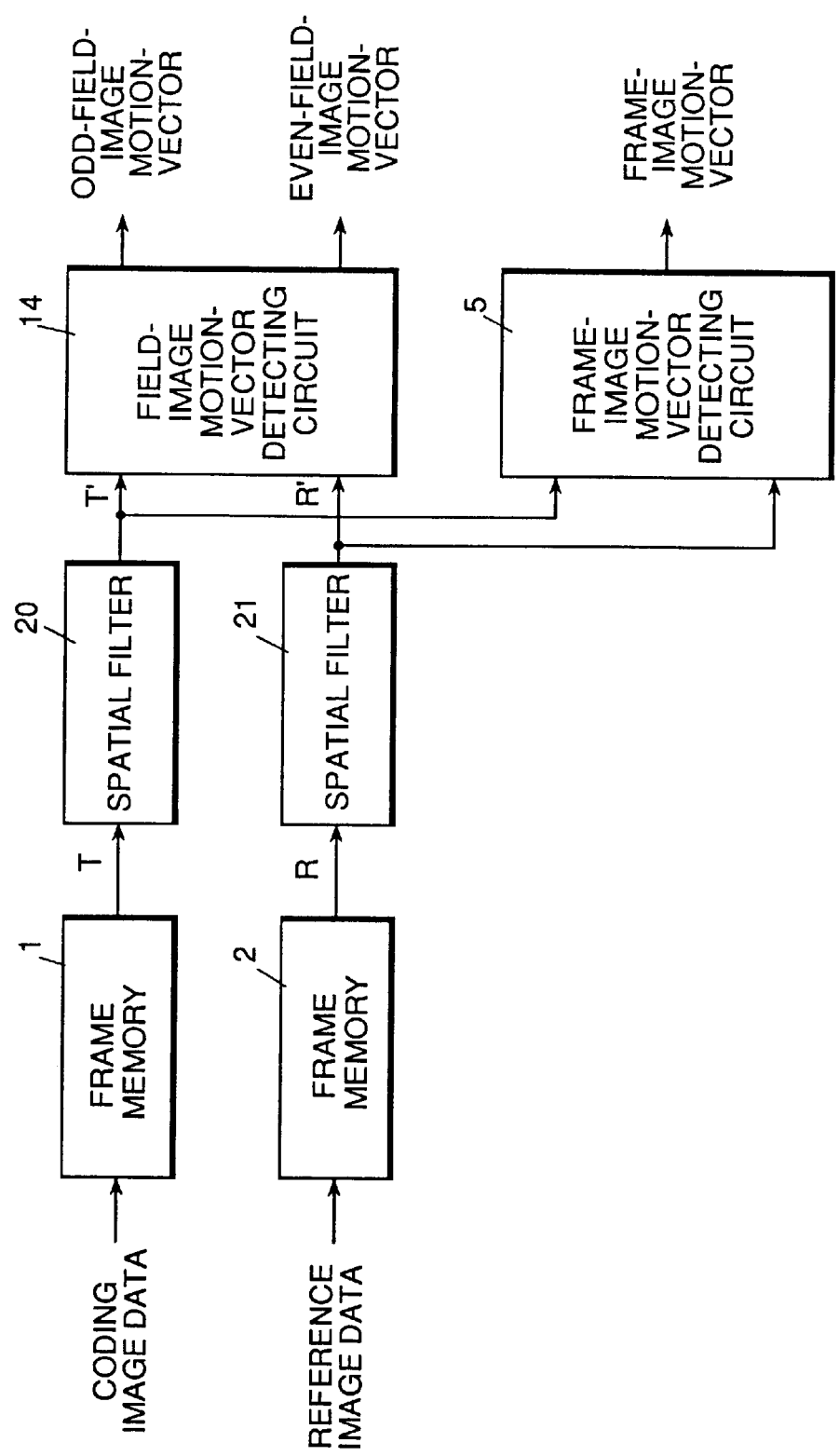
FIG. 8 is a block-diagram of a motion-vector detecting device according to another aspect of the present invention.

FIG. 8 is a block diagram of another embodiment of the present invention. In FIG. 8, numeral 20 denotes a spatial filter applied to a coding block and numeral 21 denotes a spatial filter applied to a prediction candidate-block. Components similar in function to those shown in FIGS. 6 and 7 are given the same numerals.

The embodiment of FIG. 8 differs from the embodiment of FIG. 7 only by using a common filter for fields and frame while the embodiment of FIG. 7 uses two separate spatial filters for field-based and frame-based. Accordingly, the operation of the embodiment of FIG. 8 is the same as that of the embodiment of FIG. 7.

Figure 16:
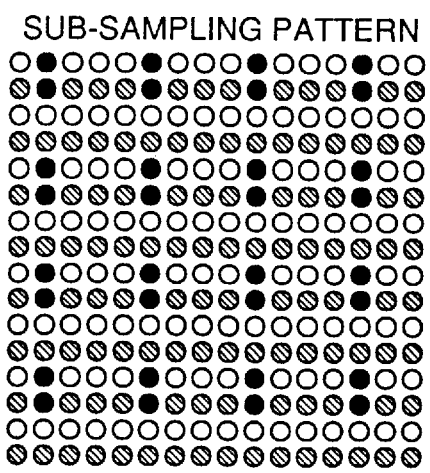
FIG. 16 is a first example of a pixel sub-sampling pattern with filter coefficients used in the embodiment of the present invention.

FIG. 16 shows, by way of example, a pixel sub-sampling pattern and filter coefficients, which are applied for a block having a size of M=N=16 by one aspect of the present invention. In FIG. 16, black circles are pixels to be used for determining matching error-values, white circles are odd-field pixels and hatched circles are even-field pixels.

A horizontal one-dimensional filter is applied in the case of FIG. 16. The application of a vertical spatial filter to a frame including a motion area shown in FIG. 5B may cause odd lines and even lines to be mixed together, resulting in decrease in motion-vector detection accuracy. Accordingly, the horizontal spatial filter shown in FIG. 16 is applied allowing vertical high-frequency components to pass therethrough. By doing so, the field motion-vector detecting accuracy is improved. The one-dimensional filter is effectively used in common for a field image and a frame image.

Figure 17:
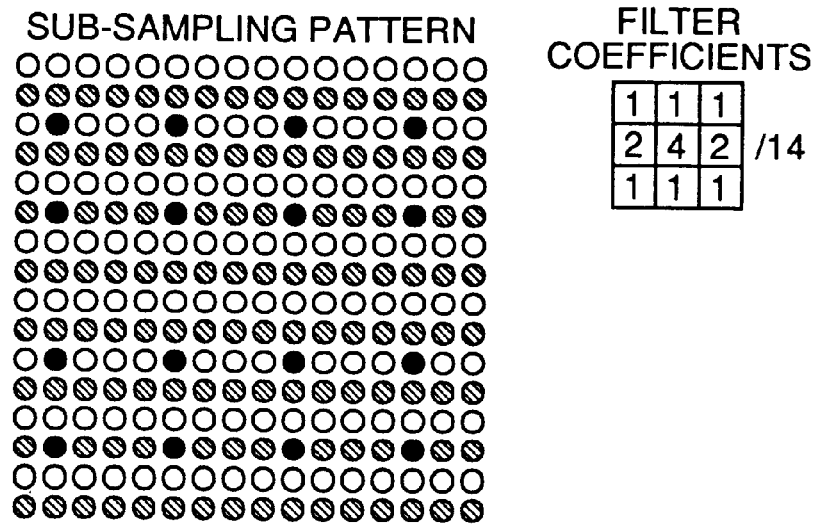
FIG. 17 is a second example of a pixel sub-sampling pattern with filter coefficients used in the embodiment of the present invention.

FIG. 17 shows, by way of example, a pixel sub-sampling pattern and filter coefficients, which are applied for a block having a size of M=N=16 by another aspect of the present invention. In FIG. 17, black circles are pixels to be used for determining matching error-values, white circles are odd-field pixels and hatched circles are even-field pixels.

In FIG. 17, a two-dimensional filter is applied, which has a wider pass-band in a vertical direction than in a horizontal direction. Thus, the filter allows most of the vertical high-frequency components produced in a motion area of an interlaced image to pass therethrough. Therefore, this filter can reduce the influence of mixture of odd-lines and even-lines in the interlaced image, realizing effective spatial filtering for both a motion area and a still area. Thus, the filter assures high detection accuracy of motion-vectors.

Namely, the embodiment shown in FIG. 17 is such that it keeps effectiveness of the one-dimensional filter applied in the embodiment of FIG. 16 and provides an adequate limitation of the band in the vertical direction to improve the detection accuracy of frame motion-vectors.

In FIG. 17, it is also possible to use, in place of the frame-based two-dimensional filter, a field-based two-dimensional filter having coefficients (A) shown in FIG. 15A, which can also reduce the influence of the vertical high-frequency components produced in the interlaced image to pixel values obtained through the filter.

In FIGS. 16 and 17, pixels (black circles) to be used for determining error-values are arranged in the same manner as shown in FIGS. 14A, 14B and 14C eliminating the need to fold pixels at the block boundary.

Figure 13:
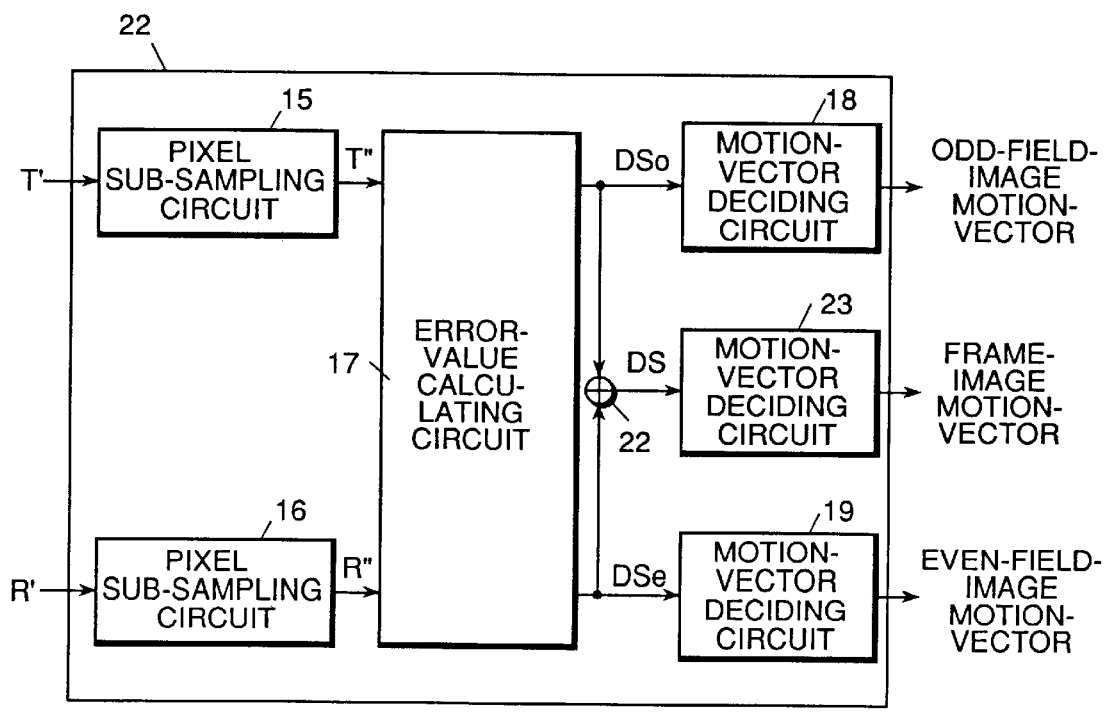
FIG. 13 is a block-diagram of a total circuit composed of the circuits of FIGS. 11 and 12 for detecting frame/frame motion-vectors.

In FIG. 8, the field-based motion-vector detecting circuit 14 of FIG. 12 and the frame-based motion-vector detecting circuit 5 of FIG. 11 can be integrated in a frame/field-based motion-vector detecting circuit shown in FIG. 13. Namely, the circuit of FIG. 13 can simultaneously detect an odd-field motion-vector, an even-field motion-vector and a frame motion-vector.

In FIG. 13, numeral 22 designates an adder for determining an error-value $DS_{i,j}$ for a frame motion-vector by adding an error-value $DSo_{i,j}$ for an odd-field motion-vector to an error-value $DSe_{i,j}$ for an even-field motion-vector and numeral 23 designates a motion-vector deciding circuit for detecting a smallest error-value $DS_{i,j}$ for frame motion-vectors. Components similar in function to those shown in FIG. 12 are given the same reference numerals.

In FIGS. 16 and 17, pixel data of a prediction candidate-block for an odd-field motion-vector (i,j) and pixel data of a prediction candidate-block for an even-field motion-vector (i,j) compose pixel data of a prediction candidate-block for a frame motion-vector (i,j). Furthermore, this embodiment uses a spatial filter in common for detecting a field motion-vector and a frame motion-vector. Therefore, the error-values have the following Equation (20):

$$DS_{i,j}=DSo_{i,j}+DSe_{i,j} \tag{20}$$

Consequently, the error-value $DS_{i,j}$ for a frame motion-vector can be determined by adding together error-values $DSo_{i,j}$ and $DSe_{i,j}$ determined by the error-value calculating circuit of the field motion-vector detecting circuit for an odd-field motion-vector and an even-field motion-vector respectively. Thus, a frame motion-vector can be detected.

This eliminates the need for the pixel sub-sampling circuit and the error-value calculating circuit in the frame motion-vector detecting circuit of FIG. 8, which can, therefore, be considerably simplified in construction and reduced in size.

Figure 9:
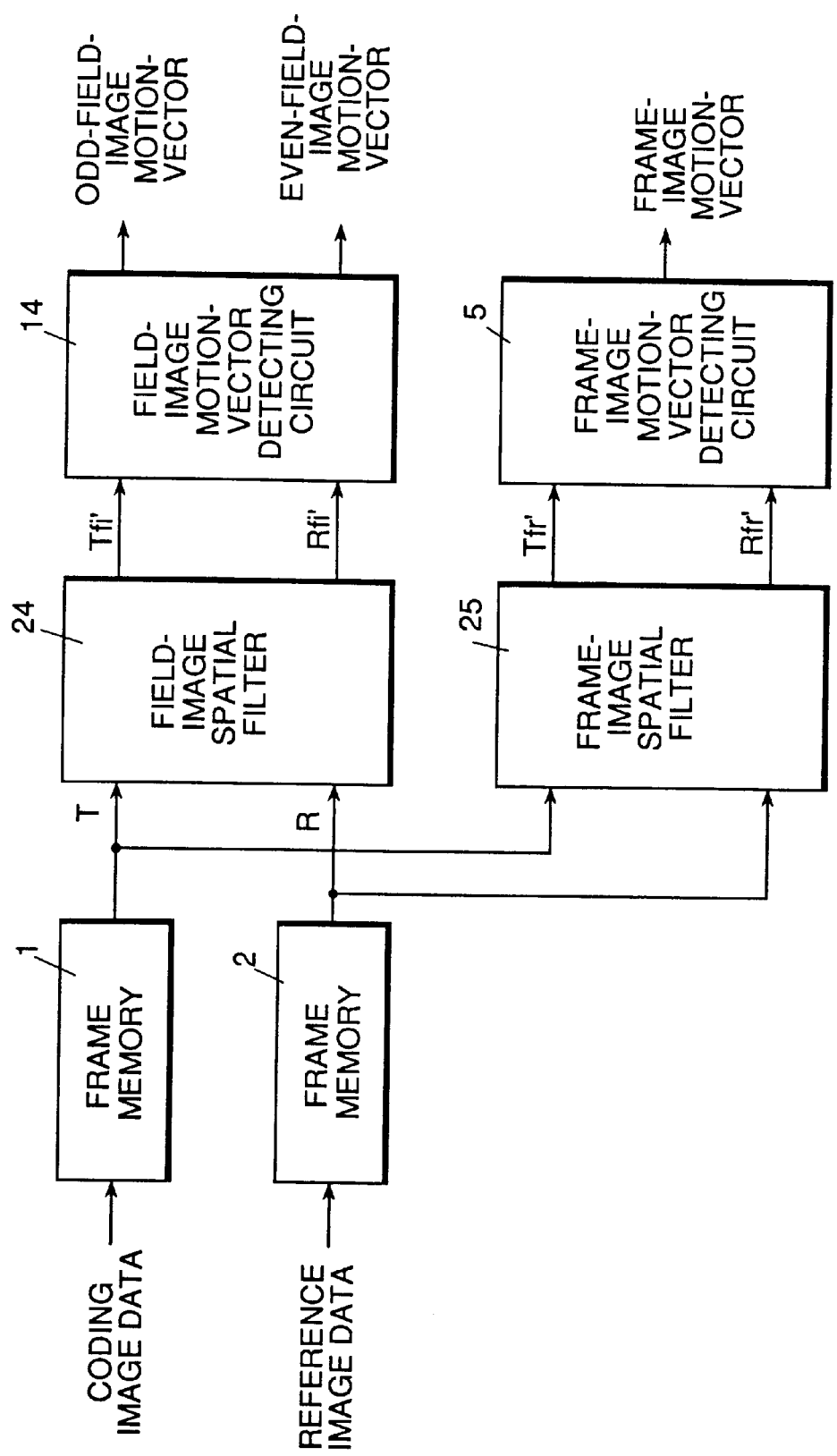
FIG. 9 is a block-diagram of a motion-vector detecting device according to another aspect of the present invention.

FIG. 9 is a block diagram of another embodiment of the present invention. In FIG. 9, numeral 24 denotes a spatial filter applied to a field-based block and numeral 25 denotes a spatial filter applied to a frame-based block.

In calculating error-values according to Equations (17), (18) and (19), pixel values Tfi', Tfr' of a band-limited coding block do not depend upon a value (i,j). Therefore, the coding block is processed by the filter circuit before calculating an error-value. The obtained pixel values Tfi', Tfr' are held in the motion-vector detecting circuit. By doing so, the need for further filtering pixel values T when calculating error-values by changing a variable (i,j). This makes it possible to use a spatial filter in common for the coding block and the prediction candidate-block, realizing the further saving in size of the circuit.

In FIG. 9, the spatial filters 10 and 11 of FIG. 7 are integrated into the spatial filter 24 while the spatial filters 12 and 13 are integrated into the spatial filter 25.

Figure 10:
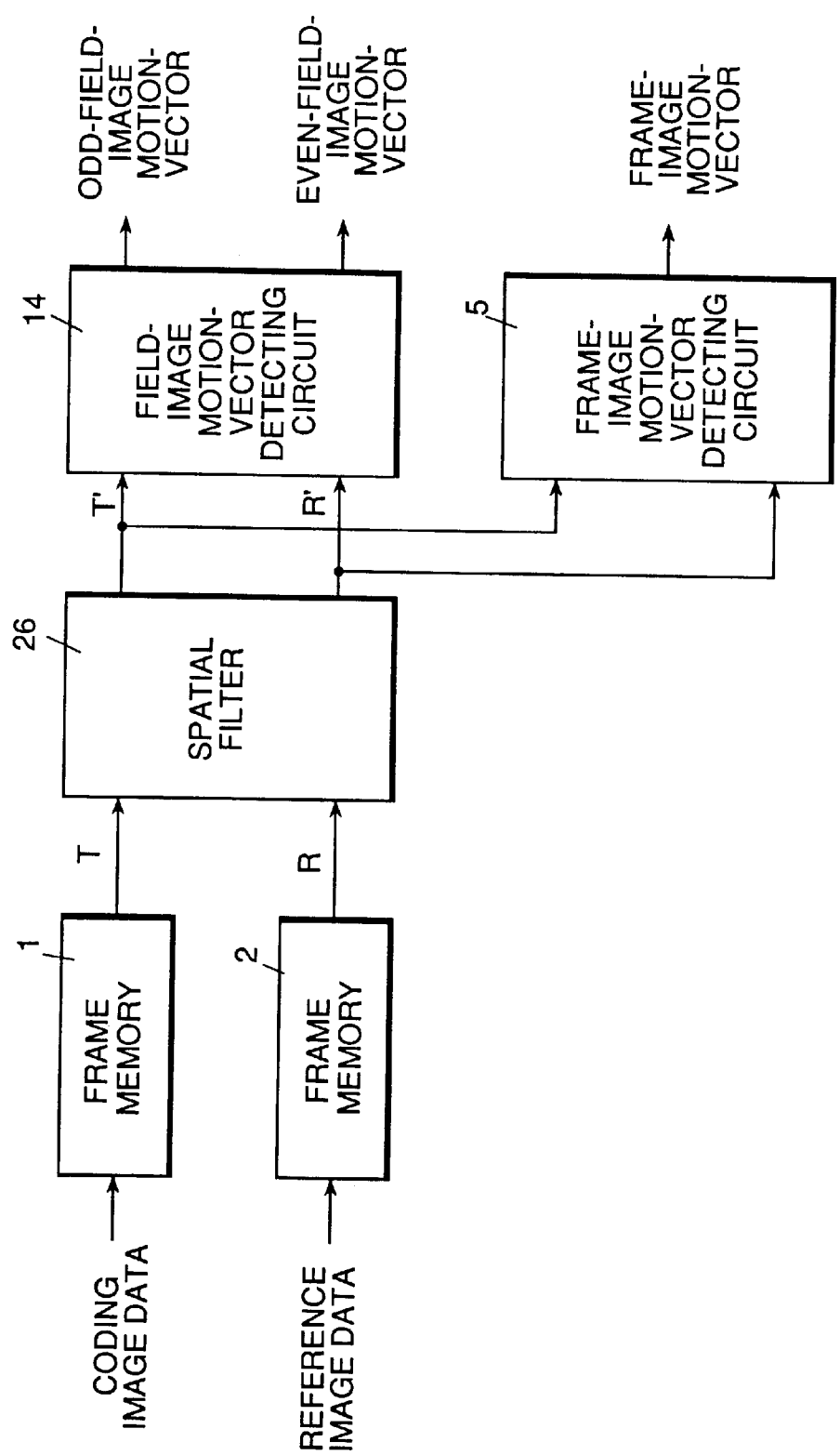
FIG. 10 is a block-diagram of a motion-vector detecting device according to another aspect of the present invention.

FIG. 10 is a block diagram of another embodiment of the present invention. In FIG. 10, numeral 26 denotes a spatial filter applied to all pixels to be used for error-value calculation.

As described for the embodiment of FIG. 9, the embodiment of FIG. 10 also uses a spatial filter used in common for coding blocks and prediction candidate-block, thus simplifying its circuitry.

In FIG. 10, the spatial filters 20 and 21 (FIG. 8) are integrated into the spatial filter 26.

Although the above-described embodiment uses, by way of example, sub-sampling at a constant interval of ½ or ¼, any other patterns can be adopted.

Although the above-described embodiment uses, by way of example, three-tap one-dimensional FIR filters and 3×3 tap two-dimensional FIR filters, filters having other quantity of taps and other filter coefficients can be used.

It is also allowed that spatial filters having different characteristics are used for processing a coding block and for processing a prediction candidate-block or one of them can be one-dimensional and the other two-dimensional.

The present invention brings the following advantageous effects:

(1) One aspect of the present invention is a motion-vector detecting device provided with a one-dimensional spatial filter, which is capable of easily alias-processing pixel data at the boundary of each block and has an easily controllable and simplified filter circuit as compared with that with a two-dimensional spatial filter. Thus, the device can detect highly accurate motion-vectors according to the subsampling method.

(2) In another aspect of the present invention, a frame-based motion-vector and a field-based motion-vector are detected with separate spatial filters respectively to adaptively restrict a frequency band of each interlaced image, thus attaining high-accuracy of detecting motion-vectors of the interlaced image according to the subsampling method.

(3) In still another aspect of the present invention, a single spatial filter is used to effectively detect both frame and field motion-vectors of an interlaced image according to the subsampling method without decreasing detection accuracy by adaptively restricting a frequency band of the interlaced image in both horizontal and vertical directions. This makes it possible to save the number of filter circuits, reducing the scale of circuitry of the frame-based motion-vector detecting device.

Furthermore, the use of the single spatial filter enables calculation of an error-value for a frame by adding an odd-field error-value to an even-field error-value, thus eliminating the need for the error-value calculating circuit and the pixel sub-sampling circuit of the frame-based motion-vector detecting circuit. This allows the frame-based motion-vector detecting circuit to be significantly simple.

(4) In aspects of the present invention, a spatial filter is used commonly for processing the coding block and the prediction candidate-block, thus realizing considerable savings in due size of the filter circuit.

(5) In another aspect of the present invention, the circuitry of the device can be substantially simplified in the same manner as the first aspect (1) above-mentioned of the present invention.

(6) In another aspect of the present invention, a two-dimensional filter can effectively suppress high-frequency components in both horizontal and vertical directions, thus assuring higher accuracy of detecting motion-vectors than a one-dimensional filter.

(7) In a further aspect of the present invention, an adequate setting of sub-sampling intervals and positions of pixels to be used for error-value calculation eliminates the need to alias-process pixel-values at the boundary of a block, thus making it possible to reduce the size of the filter circuit and simplify the operation of the device.

(8) In practice, the present invention was applied for detecting motion-vectors on 60 frames of an MPEG test sequence "Table Tennis" and coding simulation using the detected motion-vectors was made on a "Test Model" that is an MPEG-2 standard. The simulation test result shows an improvement of an S/N ratio of the decoded images by 0.8 dB in average per frame as compared with that obtained by the conventional subsampling method. The decoded images proved to have significantly improved quality by subjective estimation.

What is claimed is:

1. A motion-vector detecting device for detecting a match between a coding block on a coding image and a prediction candidate-block on a reference image in a motion-vector searching area of the reference image, comprising an one-dimensional spatial filter applied to the coding block, an one-dimensional spatial filter applied to the prediction candidate-block, a motion-vector detecting circuit for detecting a motion-vector by calculating differences between a part of pixels on the coding block and prediction candidate-block, wherein one-dimensional spatial filters are used for limiting bands to the coding block and the prediction candidate-block in vertical or horizontal direction and a motion-vector is detected by calculating matching errors between the part of pixels on the band-limited coding block and the band-limited prediction candidate-block, and in calculating error-values for a group of pixels by the motion-vector detecting circuit, block-end pixels are considered to exist inside the block boundary by the number of pixels rounded off after a decimal point corresponding to one half of the number of taps of the spatial filters.

2. A motion-vector detecting device as defined in claim 1, wherein a part of the spatial filters is one-dimensional and a remaining part is two-dimensional.

3. A motion-vector detecting device as defined in claim 2, wherein, in calculating error-values for a group of pixels by the motion-vector detecting circuit, block-end pixels are considered to exist inside the block boundary by the number of pixels rounded off after a decimal point corresponding to one half of the number of taps of the spatial filters.

4. A motion-vector detecting device for detecting a field-based motion-vector by searching a match between a field-based coding block on an interlaced coding image and a field-based candidate-block on an interlaced reference image, detecting a frame-based motion-vector by searching a match between a frame-based coding block on an interlaced coding image and a frame-based prediction candidate-block on an interlaced reference image and adaptively selecting either the field-based motion-vector or the frame-based motion-vector, comprising a first field-based spatial filter applied to the field-based coding blocks, a second field-based spatial filter applied to the field-based prediction candidate-blocks of a field-image to be matched with the field-based coding block, a field-based motion-vector detecting circuit for detecting a field-based motion-vector by calculating an error between a part of pixels on the field-based coding block and a part of pixels on a field-based prediction candidate-block, a first frame-based spatial filter applied to the frame-based coding blocks, a second frame-based spatial filter applied to frame-based prediction candidate-blocks of a frame-image to be matched with the frame-based coding block, a frame-based motion-vector detecting circuit for detecting a frame-based motion-vector by calculating an error between the part of pixels on the frame-based coding block and the part of pixels on the frame-based prediction candidate-block, wherein a field-based motion-vector and a frame-based motion-vector are detected by respective different filters with different band limitations of a field image and a frame image and by calculating a matching error between the part of pixels on the band-limited coding block and the part of pixels on the band-limited prediction candidate-block for each of the field-based image and the frame-based image.

5. A motion-vector detecting device as defined in claim 4, wherein, in calculating error-values for a group of pixels by the motion-vector detecting circuit, block-end pixels are considered to exist inside the block boundary by the number of pixels rounded off after a decimal point corresponding to one half of the number of taps of the spatial filters.

6. A motion-vector detecting device as defined in claim 4, wherein a part of the spatial filters is one-dimensional and a remaining part is two-dimensional.

7. A motion-vector detecting device as defined in claim 4, wherein the first field-based spatial filter and the first frame-based spatial filter are identical with each other and the second field-based spatial-filter and the second frame-based spatial-filter are identical with each other.

8. A motion-vector detecting device as defined in claim 7, wherein each of the spatial filters is a one-dimensional low-pass filter.

9. A motion-vector detecting device as defined in claim 7, wherein each of the spatial filters is a two-dimensional low-pass filter.

10. A motion-vector detecting device as defined in claim 7, wherein, in calculating error-values for a group of pixels by the motion-vector detecting circuit, block-end pixels are considered to exist inside the block boundary by the number of pixels rounded off after a decimal point corresponding to one half of the number of taps of the spatial filters.

11. A motion-vector detecting device as defined in claim 4, wherein the first field-based spatial filter and the second field-based spatial-filter are identical with each other and the first frame-based spatial-filter and the second frame-based spatial-filter are identical with each other.

12. A motion-vector detecting device as defined in claim 11, wherein each of the spatial filters is a one-dimensional low-pass filter.

13. A motion-vector detecting device as defined in claim 11, wherein each of the spatial filters is a two-dimensional low-pass filter.

14. A motion-vector detecting device as defined in claim 11, wherein, in calculating error-values for a group of pixels by the motion-vector detecting circuit, block-end pixels are considered to exist inside the block boundary by the number of pixels rounded off after a decimal point corresponding to one half of the number of taps of the spatial filters.

15. A motion-vector detecting device as defined in claim 4, wherein all the first and second field-based spatial-filters and the first and second frame-based spatial-filters are identical.

16. A motion-vector detecting device as defined in claim 15, wherein, in calculating error-values for a group of pixels by the motion-vector detecting circuit, block-end pixels are considered to exist inside the block boundary by the number of pixels rounded off after a decimal point corresponding to one half of the number of taps of the spatial filters.

17. A motion-vector detecting device as defined in claim 4, wherein each of the spatial filters is a one-dimensional low-pass filter.

18. A motion-vector detecting device as defined in claim 17, wherein, in calculating error-values for a group of pixels by the motion-vector detecting circuit, block-end pixels are considered to exist inside the block boundary by the number of pixels rounded off after a decimal point corresponding to one half of the number of taps of the spatial filters.

19. A motion-vector detecting device as defined in claim 4, wherein each of the spatial filters is a two-dimensional low-pass filter.

20. A motion-vector detecting device as defined in claim 19, wherein, in calculating error-values for a group of pixels by the motion-vector detecting circuit, block-end pixels are considered to exist inside the block boundary by the number of pixels rounded off after a decimal point corresponding to one half of the number of taps of the spatial filters.

* * * * *